United States Patent
Lai

(10) Patent No.: US 9,251,558 B2
(45) Date of Patent: Feb. 2, 2016

(54) FRAME DRAWING METHOD, FRAME UPDATING METHOD AND ASSOCIATED MOBILE ELECTRONIC DEVICE

(71) Applicant: MStar Semiconductor, Inc., Hsinchu Hsien (TW)

(72) Inventor: Cheng-Hung Lai, Hsinchu Hsien (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 100 days.

(21) Appl. No.: 14/313,232

(22) Filed: Jun. 24, 2014

(65) Prior Publication Data

US 2015/0145877 A1 May 28, 2015

(30) Foreign Application Priority Data

Nov. 26, 2013 (TW) ............... 102143048 A

(51) Int. Cl.
| | |
|---|---|
| *G06T 1/60* | (2006.01) |
| *G06F 3/0481* | (2013.01) |
| *G06F 3/0488* | (2013.01) |
| *G06T 1/20* | (2006.01) |
| *G09G 5/395* | (2006.01) |
| *G09G 5/34* | (2006.01) |

(52) U.S. Cl.
CPC ............ *G06T 1/60* (2013.01); *G06F 3/04817* (2013.01); *G06F 3/04883* (2013.01); *G06T 1/20* (2013.01); *G09G 5/34* (2013.01); *G09G 5/395* (2013.01); *G06T 2200/24* (2013.01); *G09G 2354/00* (2013.01); *G09G 2360/127* (2013.01); *G09G 2360/18* (2013.01)

(58) Field of Classification Search
CPC ......... G09G 5/393; G09G 5/39; G09G 5/395; G09G 2360/123; G09G 5/363
See application file for complete search history.

(56) References Cited

U.S. PATENT DOCUMENTS

| | | | |
|---|---|---|---|
| 2002/0101406 A1* | 8/2002 | Tseng | ............ G06F 3/0481 345/173 |
| 2010/0093399 A1* | 4/2010 | Kim | ............ H04M 1/0202 455/566 |

* cited by examiner

*Primary Examiner* — Todd Buttram
(74) *Attorney, Agent, or Firm* — WPAT, PC; Justin King

(57) ABSTRACT

An electronic device includes a user interface, and has a frame corresponding to a first region of the user interface. While updating the frame of the electronic device, a second region is determined from the user interface, and an image of the second frame is stored into a memory; the image of the first region is fetched from the memory according to the first region to generate the frame; a movement command is received; the first region is moved in the user interface according to the movement command; it is determined whether the moved first region exceeds the second region; and when the moved first region exceeds the second region, the image of the second region in the memory is updated. The second region includes the first region.

10 Claims, 11 Drawing Sheets

FRAME DRAWING METHOD, FRAME UPDATING METHOD AND ASSOCIATED MOBILE ELECTRONIC DEVICE

This application claims the benefit of Taiwan application Serial No. 102143048, filed Nov. 26, 2013, the subject matter of which is incorporated herein by reference.

BACKGROUND OF THE INVENTION

1. Field of the Invention

The invention relates in general to a frame drawing method, a frame updating method and an associated mobile electronic device, and more particularly, to a frame drawing method and a frame updating method that update an image of a predetermined region in a user interface by a graphics component or display the image of the predetermined region through fetching a temporarily stored image, and a mobile electronic device applying the frame drawing method or the frame updating method.

2. Description of the Related Art

When operating a user interface displayed on a touch screen of a common mobile electronic device, a user may browse various kinds of information accessed by the user interface by finger sliding movements on the user interface. When an operation of the finger sliding movement corresponds to a maximum display range of a single page displayed on the user interface, a processor of the mobile electronic device employs a graphics component (usually implemented by software) to redraw an image displayed by the user interface. However, contents of the user interface processed by the graphics component are unaffected by the above sliding movement.

To reduce the load of the processor that utilizes the graphics component to redraw the image displayed by the user interface, a common mobile electronic device temporarily stores the image of the entire user interface (greater than the actual image of a single page of the user interface) as an additional snapshot. Thus, when the user operates the user interface by a sliding movement, the processor only needs to directly fetch the part to be displayed from the above temporarily stored snapshot to complete the display corresponding to the above sliding movement. Large amounts of processing time and computation that the graphics component requires for redrawing the entire user interface can then be saved, yielding better performance of a smooth sliding operation on the user interface.

However, as the size of the user interface expands, the range of the temporarily stored image of the user interface also becomes larger. As a result, by directly implementing the above method, certain mobile electronic devices equipped with a smaller memory may fail to present expected smoothness for the corresponding sliding movement on the user interface.

FIG. 1 shows a schematic diagram of an image distribution on a user interface displayed by a touch screen of a common conventional mobile electronic device. As shown in FIG. 1, a maximum drawing range supported by the touch screen is T1, whose size is restricted by hardware specifications of the mobile electronic device. A drawing region T2 is a fixed viewable range of the user interface displayed by the touch screen. From perspectives of a user, the drawing region T2 does not exceed beyond the drawing region T1 regardless of how the drawing region T2 is moved by a touch command. In other words, with respect to processes of the mobile electronic device, the drawing region T2 is moved according to a coordinate system established by the drawing region T1.

When a user of the mobile electronic device sends out a user command by a sliding movement to slide the user interface upward by a distance D, a result that the user observes is in equivalence sliding the drawing region T2 by the distance D. However, from perspectives of the mobile electronic device, the drawing region T2 is substantially unmoved, and the drawing region T1 is in fact slid upward by the distance D. On the other hand, for the coordinate system established based on the drawing region T1, a relative position of the drawing region T2 is moved downward by the distance D.

As previously stated, with an increasing range of the drawing region T2, the amount of computation brought upon the mobile electronic device by a movement of the drawing region T2 also increases, thus obstructing the touch screen from presenting a smooth sliding effect.

FIG. 2 shows a schematic diagram of an image distribution on a user interface displayed by a touch panel of another common conventional mobile electronic device. As shown in FIG. 2, images on the touch panel are applied with a concept of hierarchical control. Assuming that the range of a drawing region A1 is a maximum controllable range of the touch screen, a drawing region A2 covering a part of the drawing region A1 may be regarded as a sub drawing region of the drawing region A1, and a graphics component for displaying the drawing region A1 may be utilized to control a graphics component for displaying the drawing region A2. Similarly, the graphics component for displaying the drawing region A2 may be utilized to control a graphics component for displaying a drawing region A3.

Under the mechanism shown in FIG. 2, when a user command sent by a user is for sliding the drawing region A3, it is known from the hierarchical relationship of the drawing regions A1, A2 and A3 that, all of the drawing regions A1, A2 and A3 need to be redrawn in response to the user command. However, if the user command is for sliding a part that is in the drawing region A2 but excluding the drawing region A3, the drawing region A3 that is not operated by the user command also needs to be redrawn as the drawing region A2 needs to be redrawn. Under the abovementioned circumstances of the increasing size of the user interface, the need of compulsorily redrawing a region such as the drawing region A3 that is not operated by a user command due to redrawing a parent drawing region is becoming frequent occurrences, thereby posing a significant load on the amount of graphics computation for a mobile electronic device.

SUMMARY OF THE INVENTION

To mitigate massive amounts of computation incurred by redrawing a drawing region on a user interface of a touch screen of a conventional mobile electronic device, a frame drawing method, a frame updating method, and a mobile electronic device applying the frame drawing method or the frame updating method are provided by the present invention.

A frame updating method applied for updating a frame of an electronic is provided by the present invention. The electronic device includes a user interface. The frame corresponds to a first region of the user interface. The frame updating method includes: determining a second region from the user interface, and drawing an image of the second region into a memory, wherein the second region includes the first region; fetching an image of the first region from the memory according to the first region to generate the frame; receiving a movement command; moving the first region in the user interface according to the movement command; determining whether the first region exceeds the second region; and when the moved first region exceeds the second region, updating the image of the second region in the memory.

An electronic device is provided by the present invention. The electronic device is configured to display a frame, and includes a user interface. The frame corresponds to a first region of the user interface. The electronic device includes a memory, a receiving unit, and a processing unit. The memory stores an image corresponding to a second region of the user interface. The second region includes the first region. The receiving unit receives a movement command. The processing unit fetches an image of the first region from the memory according to the first region to generate the frame, moves the first region in the user interface according to the movement command, and determines whether the moved first region exceeds the second region. When the moved first region exceeds the second region, the processing unit further updates the image of the second region in the memory.

A frame drawing method is further provided by the present invention. The frame drawing method is applied to draw a frame of an electronic device. The frame includes an image region and an icon that is associated with a status of an application program of the electronic device, and the image region includes the icon. The drawing method includes: drawing an image of the icon, and storing the image of the icon into a memory; updating the image of the icon according to the status of the application program; storing the updated image of the icon into the memory; and drawing the icon by using the updated image of the icon in the memory when drawing the image region.

A mobile electronic device is further provided by the present invention. The mobile electronic device is configured to display a frame, which includes an image region and an icon. The icon is associated with a status of an application program of the electronic device, and the image region includes the icon. The mobile electronic device includes a memory and a processing unit. The processing unit stores an image of the icon into the memory, updates the image of the icon according to the status of the application program, and stores the updated image of the icon into the memory. When displaying the image region, the icon is drawn by using the updated image of the icon in the memory.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 3:
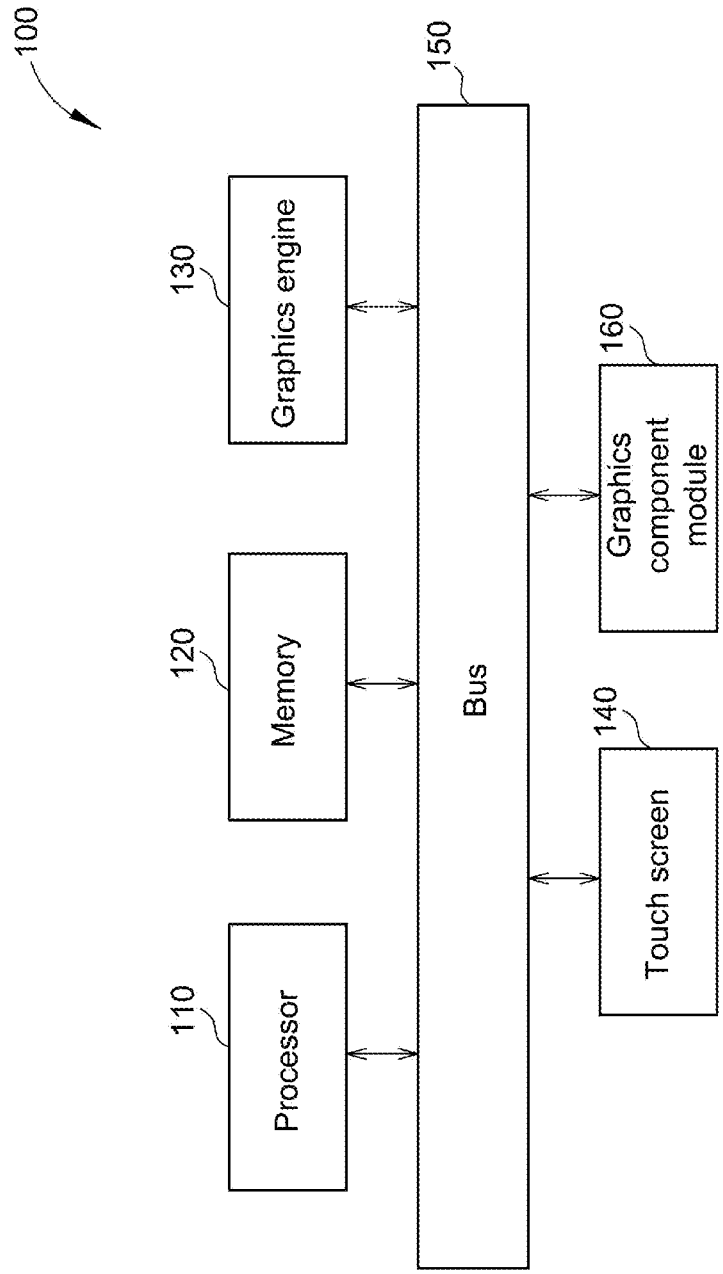
FIG. 3 is a block diagram of a mobile electronic device according to an embodiment of the present invention.

FIG. 3 shows a block diagram of a mobile electronic device 100 according to an embodiment of the present invention. As shown in FIG. 3, the mobile electronic device 100 includes a processor 110, a memory 120, a graphics engine 130, a touch screen 140, a bus 150, and a graphics component module 160. The processor 110 collaborates with various graphics components of the graphics engine 130 and the graphics component module 160 to redraw drawing regions on a user interface displayed by the touch screen 140. The drawing regions on the user interface correspond to respective graphics components in the graphics component module 160. The memory 120 temporarily stores a backup image of a drawing region when the processor 110 redraws the drawing region. Data transmission between the processor 110, the memory 120, the touch screen 140 and the graphics component module 160 is performed via the bus 150, so as to speedily process redrawn regions or backup images of drawing regions in large amounts. Details of the components for implementing the user interface drawing method of the present invention are given shortly. It should be noted that, in the embodiments below, redrawing operations (excluding pure image fetching operations) performed on the drawing regions by the processor 110 are implemented by the processor 110 calling the corresponding graphics components in the graphics component module 160 and the graphics engine 130 via the bus 150. Therefore, in the description below, for simplification purposes, such redrawing operations are mainly managed by the processor 110.

Figure 4:
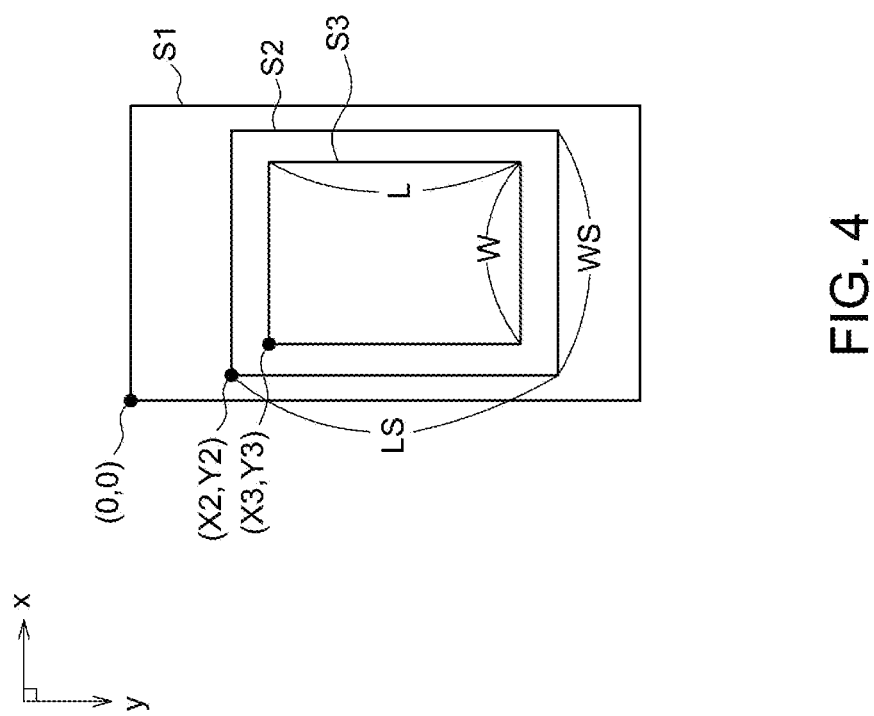
FIG. 4 is a schematic diagram of a frame updating method applied to a user interface according to an embodiment of the present invention.

FIG. 4 shows a schematic diagram of a frame updating method applied to a user interface according to an embodiment of the present invention. As shown in FIG. 4, a user interface displayed on the touch screen 140 includes a drawing region S1, a drawing region S2, and a drawing region S3. The drawing region S1 correspond to a maximum controllable range of the touch screen 140, i.e., the range of the entire user interface; the drawing region S3 corresponds to a display range of the touch screen 140 at a time point. That is to say, the drawing region S3 is a part of the drawing region S1, the size of the drawing region S2 is between those of the drawing region S1 and the drawing region S3, and the drawing region S2 is also a part of the drawing region S1. According to an embodiment of the present invention, the processor 110 draws a part of the drawing region S1 (i.e., the drawing region S2) in advance and stores the drawn image into the memory 120. As such, when displaying the drawing region S3, the drawing region S3 can be readily displayed by using the image of the drawing region S2 stored in the memory 120. Under all circumstances, the drawing region S1 is larger and completely covers the drawing regions S2 and S3. In general, the drawing region S2 is larger than and completely covers the drawing region S3, whereas the drawing region S3 may temporarily exceed the range covered by the drawing region S2 based on a sliding operation of a user command that a user sends via the touch screen 140.

Since the drawing region S1 corresponds to the maximum controllable range of the touch screen 140, any changes in the drawing regions S2 and S2 do not exceed beyond the range of the drawing region S1. Further, the drawing regions S2 and S3 are in equivalence located under a coordinate system constructed by the drawing region S1. In one embodiment of the present invention, when an x-axis (the horizontal axis) and a y-axis (the vertical axis) of the coordinate system are set as in FIG. 4, the coordinates of the upper-left vertex of the drawing region S1 may be set as (0, 0) representing an origin, the coordinates of the upper-left vertex of the drawing region S2 may be set as (X2, Y2), and the coordinates of the upper-left vertex of the drawing region S3 may be set as (X3, Y3), where X2, Y2, X3 and Y3 are greater than 0, and X3>X2 and Y3>Y2.

The drawing region S3, which represents the display range that the touch screen 140 displays at a particular time point, has a width W and a length L in fixed values. In other words, the drawing region S3 has a fixed size. Given that the drawing region S2 completely covers and is larger than the drawing region S3, and the drawing region S1 completely covers and is larger than the drawing region S2, a length LS and a width WS of the drawing region S2 may be dynamically configured, giving the drawing region S2 has a dynamically adjustable size.

The corresponding coordinates (i.e., position information) and sizes of the drawing regions S2 and S3 are temporarily stored in the memory 120 under the control of the processor 110. Further, according to the coordinates and sizes of the drawing regions S2 and S3, the processor 110 determines whether the drawing region S3 is moved and exceeds the range of the drawing region S2 each time a user command moves the drawing region S3.

As previously described, the processor 110 also draws the image R (not shown) of the drawing region S2 and stores the image R into the memory 120 in advance. The size of the image R completely covers and equals the drawing region S2, and is updated in the memory 120 by the processor 110 under certain conditions.

Figure 5:
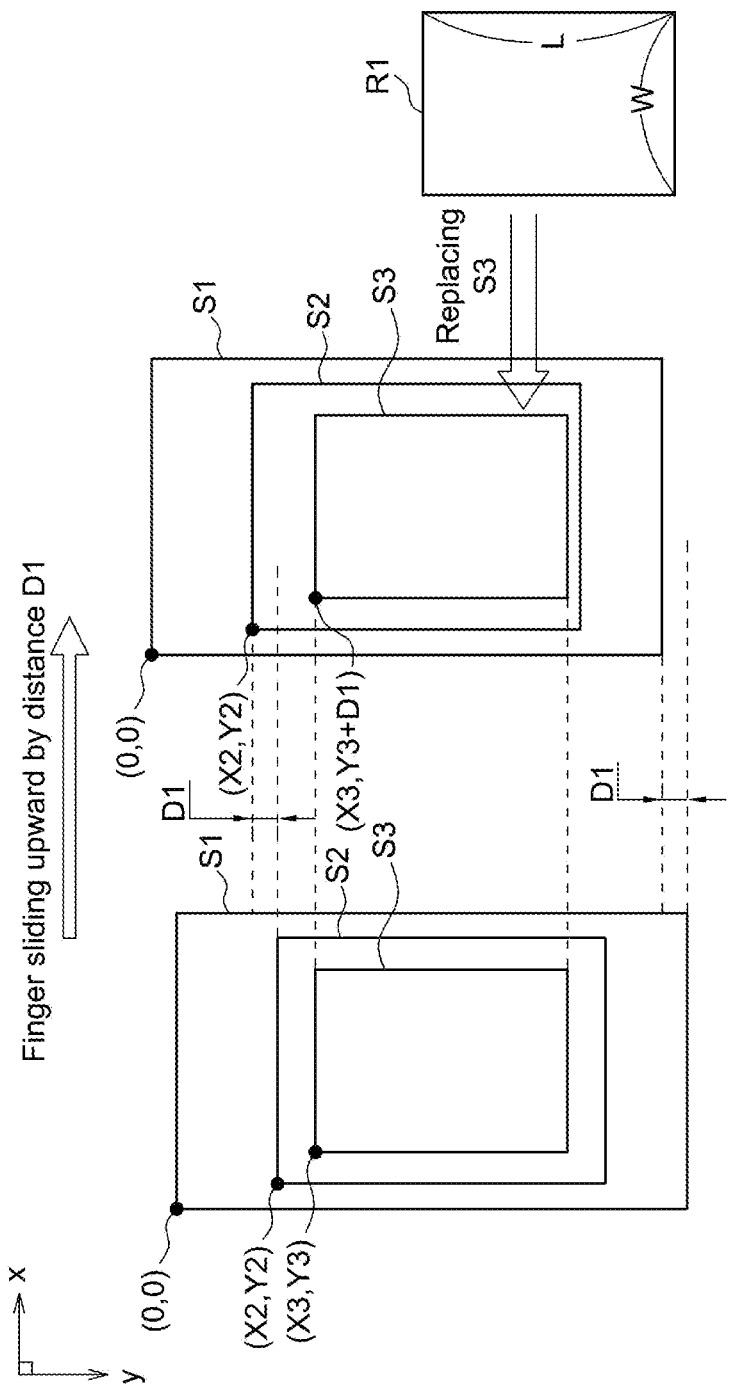
FIG. 5 is a schematic diagram of a frame updating method according to an embodiment of the present invention when a drawing region S3 in FIG. 4 is moved according to a sliding operation of a user command and does not exceed a range of a drawing region S2.

FIG. 5 shows a schematic diagram of a frame updating method according to an embodiment of the present invention when the drawing region S3 in FIG. 4 is moved according to a sliding operation of a user command and does not exceed the range of the drawing region S2. As shown in FIG. 5, when the user command that the user sends via the touch screen 140 is to move the user interface (i.e., the fixed range covered by the drawing region S3) upward by a distance D1, the drawing region S3 is substantially moved downward relative to the drawing regions S1 and S2 by the distance D1. The new coordinates of the upper-left vertex of the drawing region S3 are updated to (X3, Y3+D1) by the processor 110, and the updated coordinates are stored into the memory 120 by the processor 110.

After being moved according to the user command, the drawing region S3 does not exceed the range of the drawing region S2. Therefore, upon detecting such condition, the processor 110 performs display by directly fetching an image R1 corresponding to the moved drawing region S3 from the image R stored in the memory 120. An advantage of the above approach is that, before displaying the moved drawing region S3, the processor 110 need not spend additional time and computation to call again graphics components to draw the drawing region S3, thereby maintaining the smoothness in displaying the sliding movement in a corresponding frame. In addition, under the condition shown in FIG. 5, the drawing region S2 need not be updated, and so the image R stored in the memory 120 need not be updated either; that is, no additional time and computation are required to redraw the drawing region S2.

Figure 6:
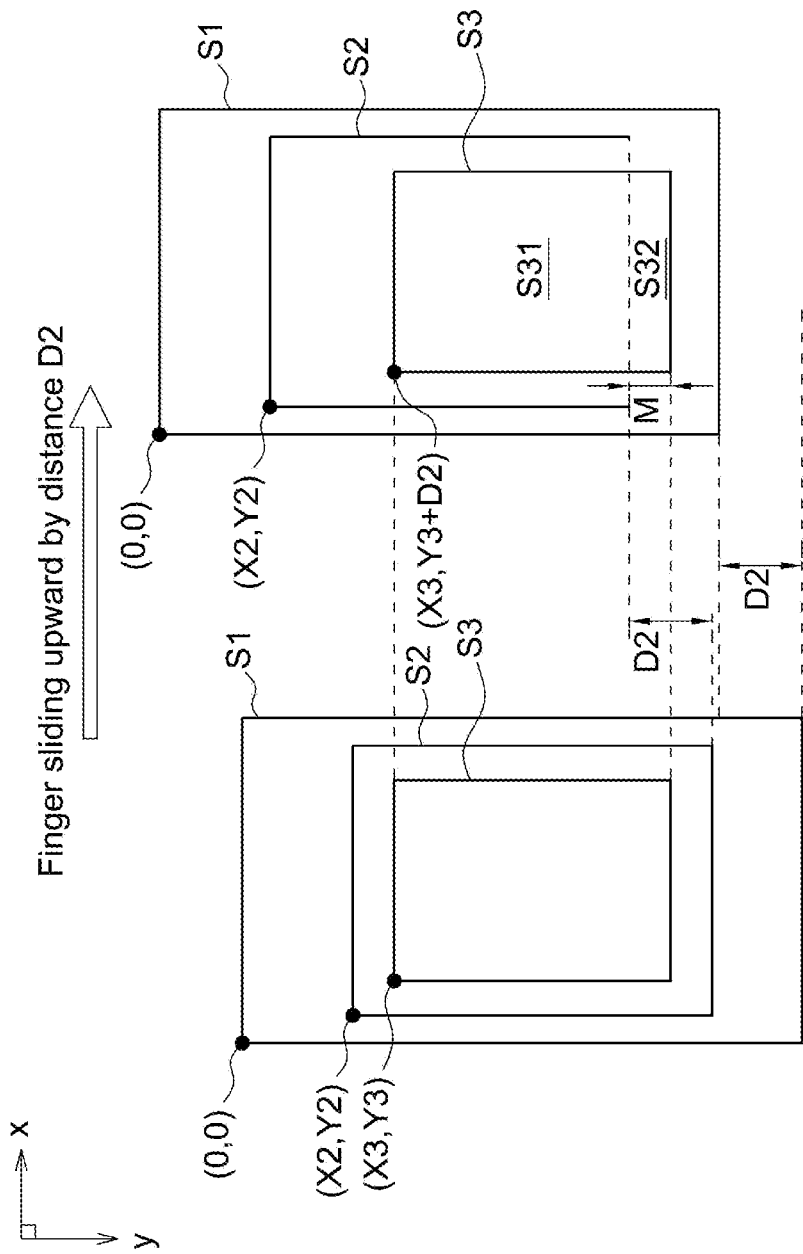
FIG. 6 is a schematic diagram of a frame updating method according to an embodiment of the present invention when a drawing region S3 in FIG. 4 is moved according to a sliding operation of a user command and exceeds a range of the drawing region S2.

FIG. 6 shows a schematic diagram of a frame updating method according to an embodiment of the present invention when the drawing region S3 in FIG. 4 is moved according to a sliding operation of a user command and exceeds the range of the drawing region S2. As shown in FIG. 6, when the user command that the user sends via the touch screen 140 moves the user interface upward by a distance D2, the drawing region S3 is substantially moved downward relative to the drawing regions S1 and S2 by the distance D2. Upon detecting that the drawing region S3 is moved and exceeds the range of the drawing region S2, the processor 110 first updates the new coordinates of the upper-left vertex of the drawing region S3 to (X3, Y3+D2). Since a part of the moved drawing region S3 exceeds the range covered by the drawing region S2, the drawing region S3 includes a drawing region S32 that is non-overlapping with the drawing region S2 and a drawing region S31 that overlaps with the drawing region S2. The processor 110 then needs to first determine an updated drawing region S2 that covers the moved drawing region S3. That is to say, the processor 110 needs to have the updated drawing region S2 that simultaneously covers the drawing regions S32 and S31. Accordingly, the processor 110 updates the image R stored in the memory 120, and finally fetches the image corresponding to the moved drawing region S3 from the memory 120 and displays the fetched image on the touch screen 140.

Figure 7:
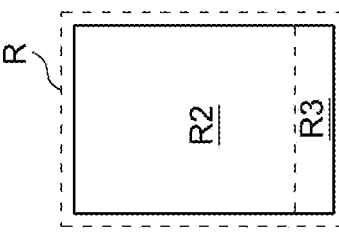
FIG. 7 is a schematic diagram of combining a drawing region S31 and a drawing region S32 in FIG. 6 to display an image R according to an embodiment of the present invention.
Figure 7:
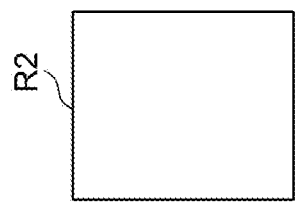
Figure 7:
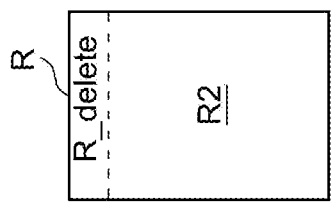

FIG. 7 shows a schematic diagram of updating the image R stored in the memory 120 according to an embodiment of the present invention. In FIG. 7, the processor 110 first deletes a sub-image R_Delete of the image R stored in the memory 120 according to the drawing regions S31 and S32, and keeps another sub-image R2 of the image R. It should be noted that, the image R is stored at a section of continuous addresses in the memory 120, and so the sub-image R_Delete and the sub-image R2 included in the image R are also stored in continuous addresses in the memory 120. A starting address of the sub-image R2 adjacently follows an ending address of the sub-image R_Delete. Next, the processor 110 utilizes a memory copy instruction to copy contents of the sub-image R2 to a section of continuous memory addresses starting from the starting address of the sub-image R_Delete in the memory 120. The processor 110 then calls the graphics components to draw a sub-image R3, and stores contents of the sub-image R3 to a section of continuous memory addresses starting from the ending address of the sub-image R2 and ending at the ending address of the image R. In the embodiment, the size of the sub-image R3 equals the size of the sub-image R_Delete. That is to say, the original image R is consisted of the sub-image R_Delete and the sub-image R2, and the updated image R is consisted of the sub-image R2 with a relocated storage position and the newly drawn sub-image R3. The sub-image R2 includes an image corresponding to the drawing region S31, and the sub-image R3 includes an image corresponding to the drawing region S32. Thus, the updated image R includes an image corresponding to the moved drawing region S3. As such, the memory 110 fetches the image corresponding to the moved drawing region S3 from the memory 120 and displays the fetched image on the touch screen 140.

In one embodiment of the present invention, when the processor 110 fetches and displays the moved drawing region S3, the position and size of the drawing region S2 may be dynamically adjusted. The processor 110 then adjusts the coordinates (position information, e.g., the coordinates of the upper-left vertex) of the drawing region S2 according to the adjusted drawing region S2, draws a corresponding image and stores the image into the memory 120.

An advantage of the approach in FIG. 7 is that, as the sub-image R2 in the image R need not be redrawn by the processor 110 through the graphics engine 130, a part of computation and processing time are saved, and computation and processing time are only required for drawing the sub-image R3, thereby overcoming the issue of the large amounts of computation and processing time brought about by redrawing the drawing region T2 having an increased size in the prior art. The improvement offered by the present invention gets more apparent as the ratio of the drawing region S31 in the drawing region S3 gets larger, i.e., as the ratio of the moved drawing region S3 exceeding the drawing region S2 gets smaller. Further, the step of updating the image R in FIG. 7 are performed within the same section of continuous memory addresses in the memory 120, and memory resources consumed and allocated for updating the image are also fixed, meaning that no additional load is posed on the memory 120 during updating.

When the drawing region S3 is moved by the user command, it is possible that the movement range is too large in a way that the drawing region S3 completely exceeds the drawing region S2. That is, only the drawing region S32 but not the drawing region S31 exists between the drawing regions S3 and S2. In the above situation, taking FIG. 7 for example, the image R includes only the sub-image R_Delete but not the sub-image R2. In response, the processor 110 may draw the sub-image R3 directly based on the change in the drawing region S2 to provide an updated image R that includes only the sub-image R3. That is to say, the starting address and the ending address of the sub-image R3 are respectively the same as the starting address and the ending address of the image R.

In another embodiment of the present invention, in addition to processing a situation where the user interface is slid upward by the user command, a situation where the user interface is slid downward by the user command may also be processed by the frame updating method shown in FIGS. 4 to 7. Alternatively, instead of processing vertical movements of the user interface as in the foregoing situations, horizontal movements of the user interface may also be applied. Details of such process can be easily deduced by one person skilled in the art with reference to the frame updating method and the associated description, and shall be omitted herein. Further, in another embodiment of the present invention, in addition to processing vertical movements and horizontal movements of the user interface, situations where the user interface is moved slantingly may also be processed.

Figure 8:
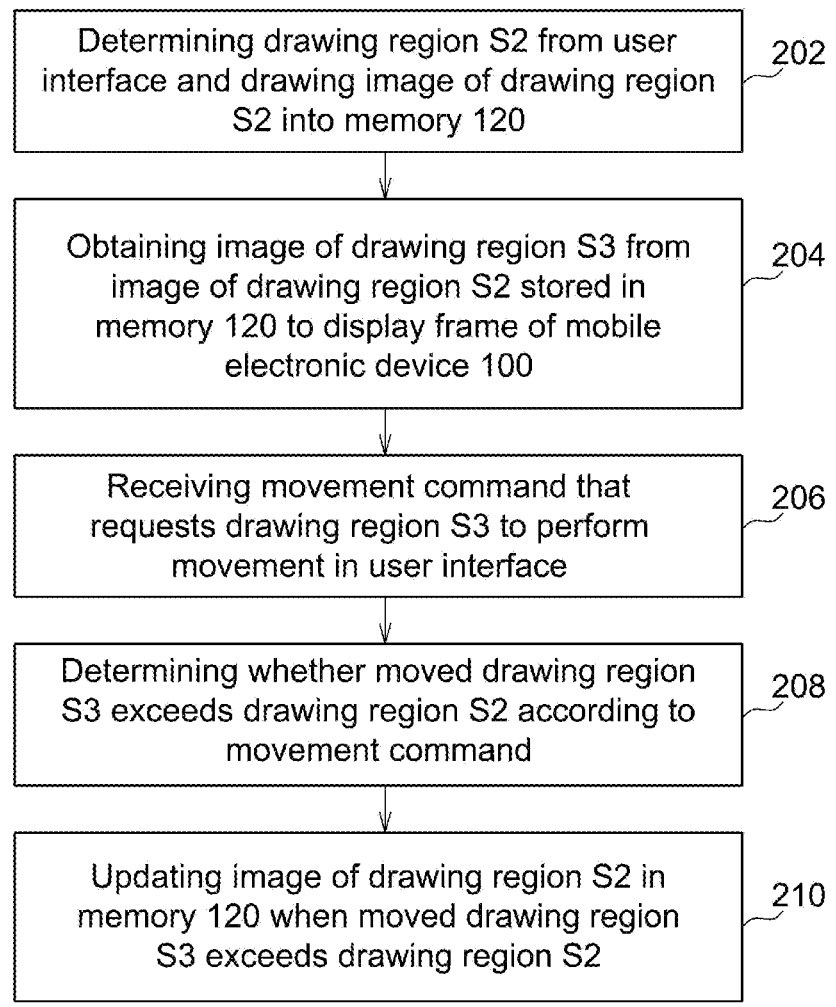
FIG. 8 is a flowchart of a frame updating method according to an embodiment of the present invention and the frame updating method in FIGS. 4 to 7.

FIG. 8 shows a flowchart of a frame updating method according to an embodiment of the present invention and the frame updating method in FIGS. 4 to 7. As shown in FIG. 8, the frame updating method of the present invention includes the following steps.

In step 202, a drawing region S2 is determined from the user interface, and an image of the drawing region S2 is drawn and stored into the memory 120.

In step 204, an image of the drawing region S3 is obtained from the image of the drawing region S2 in the memory 120 to display a frame of the mobile electronic device 100.

In step 206, a movement command is received. The movement command requests to perform a movement on the drawing region S3 in the user interface.

In step 208, it is determined whether the moved drawing region S3 exceeds the drawing region S2 according to the movement command.

In step 210, when the moved drawing region S3 exceeds the drawing region S2, the image of the drawing region S2 in the memory 120 is updated.

The steps in FIG. 8 are a summary of the frame updating method in FIGS. 4 to 7. Other embodiments derived from appropriate modifications and reasonable combinations of the above steps or applied with limitations mentioned above are to be regarded as embodiments of the present invention.

Figure 1:
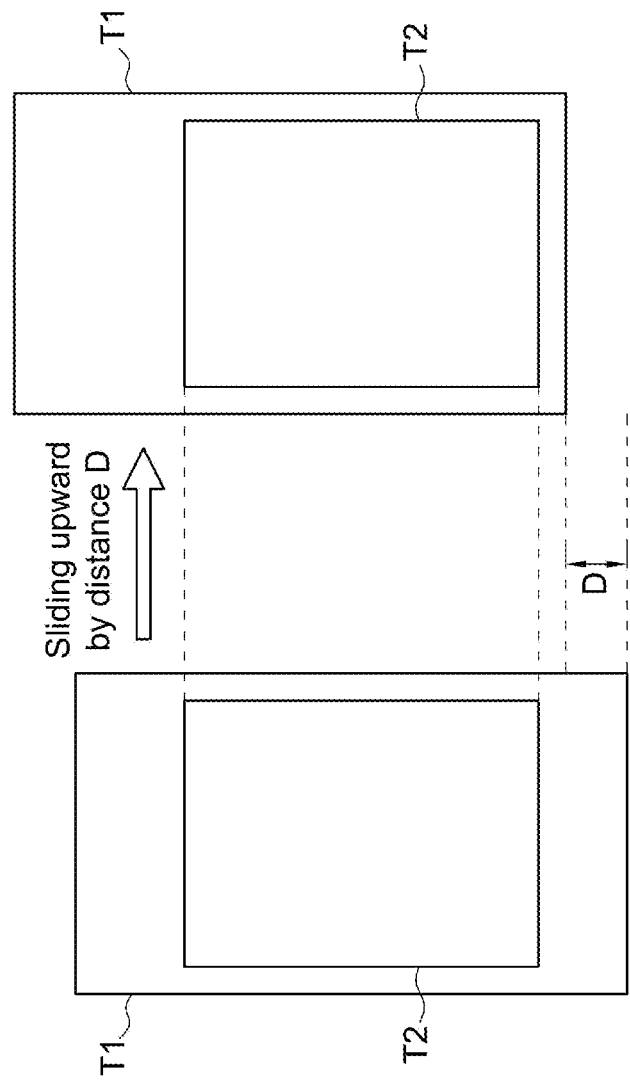
FIG. 1 and FIG. 2 are schematic diagram of an image distribution on a user interface displayed by a touch screen of a common conventional mobile electronic device.
Figure 9:
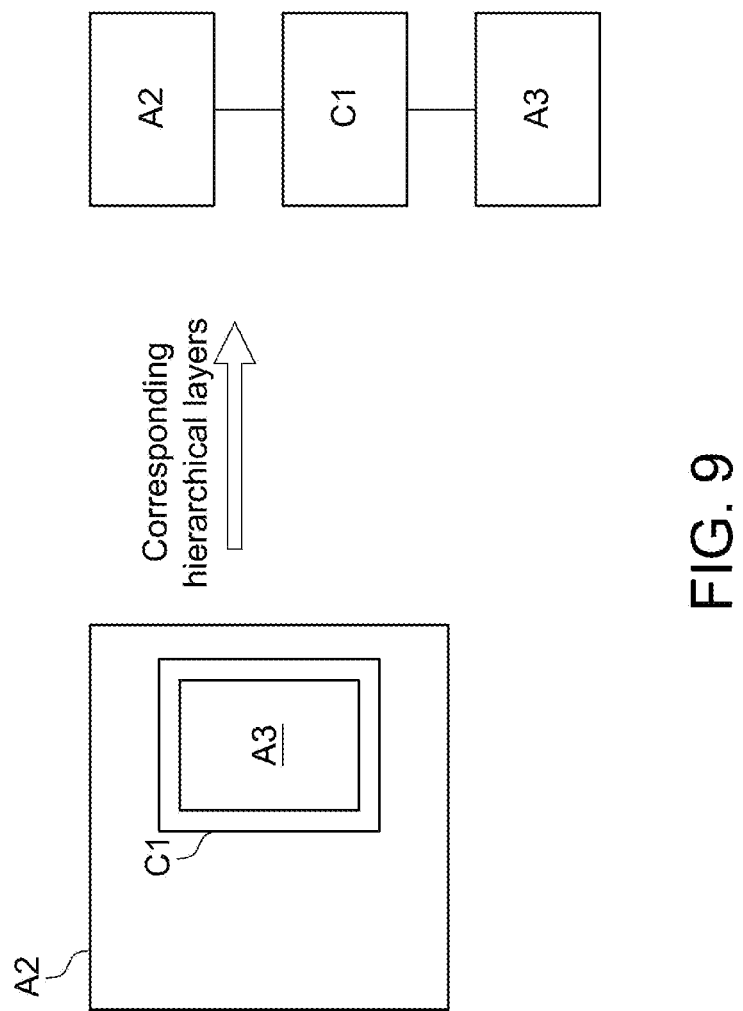
FIG. 9 and FIG. 10 are schematic diagram of a frame drawing method with an assistance of a decorator component according to an embodiment of the present invention.
Figure 10:
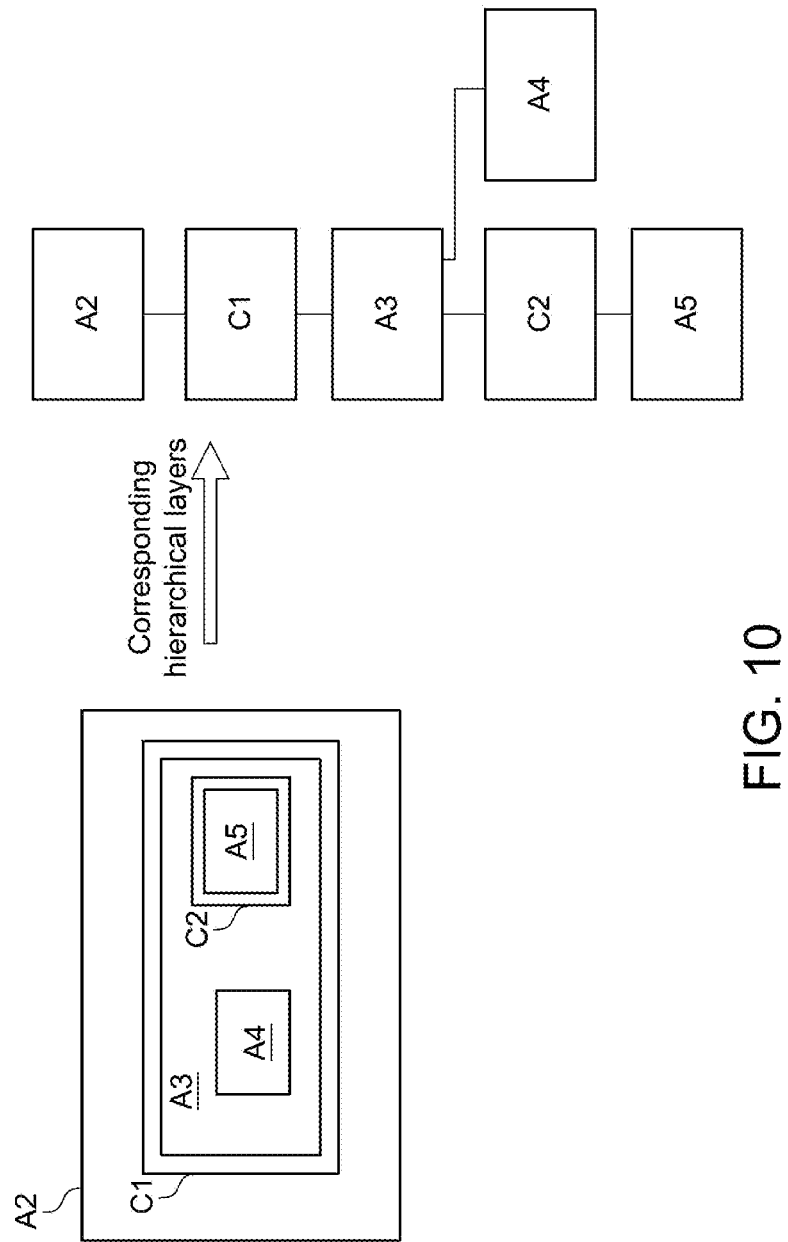

The frame updating method shown in FIGS. 4 to 8 is for solving issues of the prior art in FIG. 1. A frame drawing method to be described with reference to FIGS. 9 and 10 is for solving issues of the prior art in FIG. 2. The frame drawing method in FIGS. 9 and 10 may be implemented by the mobile electronic device 100 in FIG. 3.

Figure 2:
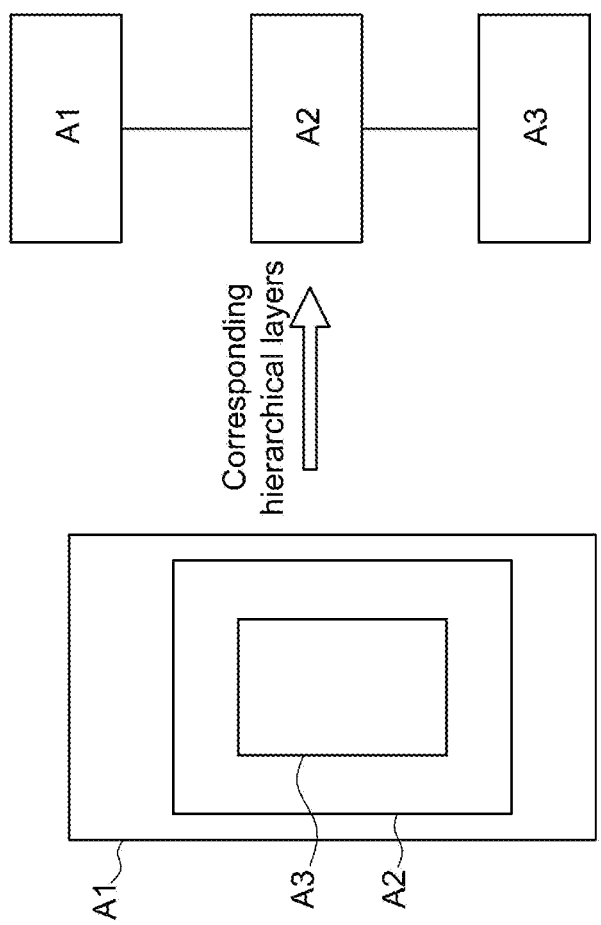

FIG. 9 shows a schematic diagram of a frame drawing method according to an embodiment of the present invention. A main difference of the embodiment in FIG. 9 from the conventional solution in FIG. 2 is that, in addition to determining by the processor 110 whether updating between the drawing regions A2 and A3 is required in response to a user command received by the touch screen according to hierarchy, a decorator component C1 is disposed between the drawing regions A2 and A3, so that the processor 110 may control whether the drawing region A3 needs to be redrawn via the decorator component C1. Although an icon region of the decorator component C1 shown in FIG. 9 covers and is slightly larger than the drawing region A3, a controllable range of the decorator component C1 is substantially the range covered by the drawing region A3. The depiction of the decorator component C1 being slightly larger than the drawing region A3 in FIG. 9 is merely for better representing the controllable range of the decorator component C1. It should be noted that, the decorator component C1 may be the processor 110.

Via the control of the decorator component C1, the processor 110 may draw an image of the drawing region A3 in advance, and store the image into the memory 120.

The mobile electronic device 100 receives various types of updating commands when operating, e.g., notifications of new emails or new messages received. When the mobile electronic device 100 receives an external updating command, updating of an image of a display frame may be required. Assuming that the drawing region A3 represents an icon of an email or a message, when the mobile electronic device 100 receives an external new email or new message, the drawing region A3 may need to display a prompting message such as displaying a new value for reminding the user of the above event of receiving a new email or new message. According an embodiment of the present invention, the processor 110 requests the graphics engine and graphics component module of the drawing region A3 via the decorator component C1 to draw an updated image of the drawing region A3, and to store the updated image into the memory 120. When the mobile electronic device 100 is to update or display a frame, according to the hierarchy in FIG. 9, the processor 110 first requests the graphics engine and graphics component module of the drawing region A2 to draw the drawing region A2. At this point, the graphics engine and graphics component module of the drawing region A2 request the decorator component C1 to provide the image of the drawing region A3. If the drawing region A3 need not be updated, the decorator component C1 directly fetches the image of the drawing region A3 from the memory 120 for a direct use, thereby saving the time for redrawing the drawing region A3 when the processor 110 requests to draw the drawing region A2. If the drawing region A3 need be updated, the decorator component C1 requests the graphics engine and graphics component module of the drawing region A3 to draw the updated image of the drawing region A3, to store the updated image to the memory 120, and to provide the updated image for the use of the graphics engine and graphics component module of the drawing region A2. Further, the image of the drawing region A3 is arranged in a section of continuous memory addresses in the memory 120 for access. In other words, the non-updated image of drawing region A3 occupies a section of continuous memory addresses in the memory 120, and the updated image of drawing region A3 also occupies the same section of continuous memory addresses in the memory 120. In another embodiment of the present invention, to prevent from using memory addresses other than the designated section of continuous memory addresses, a memory duplication command may be utilized to assist the above process of updating contents of the drawing region A3 in the memory 120.

It should be noted that, upon receiving the updating command, a time point at which the processor 110 updates the contents of the drawing region in the memory 120 and a time point at which the processor 110 redraws the display frame may be independent. In other words, after the processor 110 updates the contents of the drawing region A3 in the memory 120, the processor 110 may be triggered to redraw the display frame by periodically activating the user interface or by activating the user interface by the user. Thus, when the processor 110 is triggered to redraw the display frame, the updated drawing region A3 can be directly fetched from the memory 120 as it is already stored in the memory 120. Further, the time that the processor 110 needs to redraw the display frame is also shortened.

The frame drawing method of the present invention shown in FIG. 9 is not limited to a single hierarchical layer represented by the drawing regions A2 and A3, and may be further applied to multiple hierarchical layer regions having more than two hierarchy layers. FIG. 10 shows a schematic diagram of a user interface drawing method according to an embodiment of the present invention. Main differences of FIG. 10 from FIG. 9 are additional drawing regions A4 and A5 in the drawing region A3, and an additional decorator component C2 between the drawing regions A3 and A5. Thus, the processor 110 may directly control the updating of the drawing region A5 via the decorator component C2. In other words, the updating of the drawing region A5, unaffected by the updating of the drawing region A3, is independent from the drawing mechanism of the drawing region A3. Similarly, when disposing the decorator component 2, the processor 110 also stores an image of the drawing region A5 in the memory 120 in advance.

It should be noted that, whether to dispose a decorator component on a drawing region is determined by a user command entered by a user. Further, as the number or the updating frequency of drawing regions controlled by the decorator component gets larger/higher, the more apparent the time saved for the redrawing performed by the processor 110.

Figure 11:
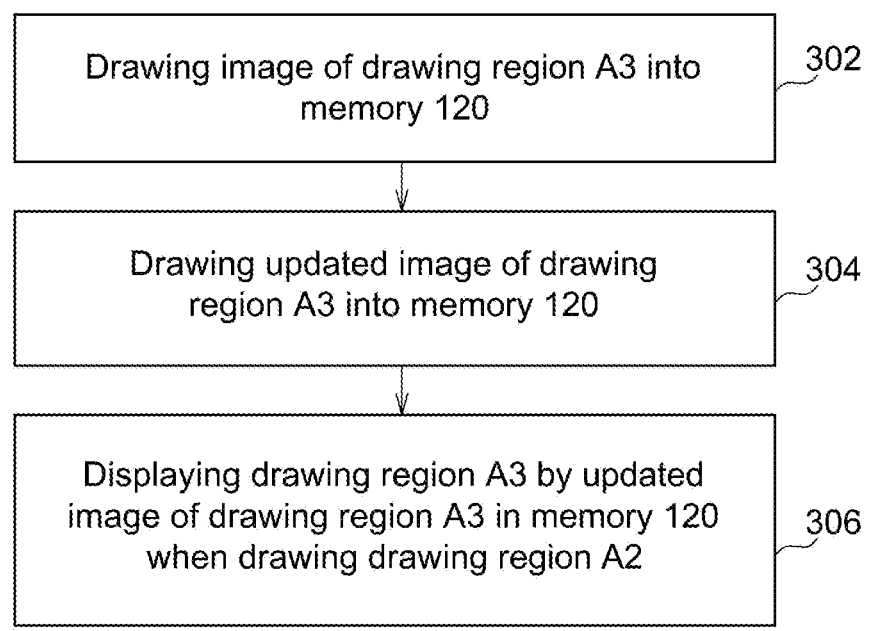
FIG. 11 is a flowchart of a frame drawing method according to an embodiment of the present invention and the frame drawing method in FIGS. 9 and 10.

FIG. 11 shows a flowchart of a frame drawing method according to an embodiment of the present invention and the frame drawing method in FIGS. 9 and 10. As shown in FIG. 11 and with the example shown in FIG. 9 or FIG. 10, the frame drawing method of the present invention includes the following steps.

In step 302, an image of the drawing region A3 is drawn into the memory 120.

In step 304, an updated image of the drawing region A3 is drawn into the memory 120.

In step 306, when drawing the drawing region A2, the updated image of the drawing region A3 in the memory 120 is utilized to display the drawing region A3.

Although the steps in FIG. 11 are exemplified by the drawing operations between the drawing regions A2 and A3, the steps may also be applied to the drawing operations between the drawing regions A3 and A5 in FIG. 10. Other embodiments derived from appropriate modifications and reasonable combinations of the above steps or applied with limitations mentioned above are to be regarded as embodiments of the present invention.

As above, a frame updating method, a frame drawing method and a mobile electronic device are disclosed by the present invention. By directly replacing a part of drawing regions that need not be updated in the user interface with a backup image stored in advance, computation and processing time for redrawing an updated drawing region may be saved, thereby offering satisfactory smoothness in operations on the user interface of the mobile electronic device.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A frame updating method, applied for updating a frame of an electronic device, the electronic device comprising a user interface, the frame corresponding to a first region of a user interface, the frame updating method comprising:
   determining a second region from the user interface, and storing an image of the second region into a memory, wherein the second region comprises the first region;
   fetching an image of the first region from the memory according to the first region to generate the frame;
   receiving a movement command;
   performing a movement on the first region in the user interface according to the movement command;
   determining whether the moved first region exceeds the second region; and
   when the moved first region exceeds the second region, updating the image of the second region in the memory.

2. The frame updating method according to claim 1, wherein the step of updating the image of the second region in the memory comprises:
   storing an updated image of the second region into the memory;
   wherein, the updated image of the second region comprises an image of the moved first region, and the image of the second region and the updated image of the second region are stored at same memory addresses in the memory.

3. The frame updating method according to claim 1, wherein the step of updating the image of the second region in the memory comprises:
   detecting whether an overlapping region exists between the moved first region and the second region, and duplicating an image of the overlapping region from the memory when the overlapping region exists between the moved first region and the second region; and
   updating the image of the second image in the memory by the duplicated image, wherein the image of the second region and the updated image of the second region are stored in same memory addresses in the memory.

4. The frame updating method according to claim 1, wherein the step of performing the movement on the first region in the user interface according to the movement command updates position information of the moved first region according to the movement instructed by the movement command and the position information of the unmoved first region.

5. The frame updating method according to claim 4, wherein the step of determining whether the moved first region exceeds the second region is performed according to the position information of the moved first region and position information of the second region.

6. An electronic device, configured to display a frame, the electronic device comprising a user interface, the frame corresponding to a first region of the user interface, the electronic device comprising:
   a memory, configured to store an image of a second region of the user interface, wherein the second region comprises the first region;
   a receiving unit, configured to receive a movement command; and
   a processing unit, configured to fetch an image of the first region from the memory according to the first region to generate the frame, to perform a movement on the first region in the user interface according to the movement command, to determine whether the moved first region exceeds the second region, and to update the image of the second region in the memory when the moved first region exceeds the second region.

7. The electronic device according to claim 6, wherein the processing unit stores an updated image of the second region into the memory, the updated image of the second region comprises an image of the moved first region, and the image of the second region and the updated image of the second region are stored at same memory addresses in the memory.

8. The electronic device according to claim 6, wherein the processing unit further detects whether an overlapping region exists between the moved first region and the second region, duplicates an image of the overlapping region from the memory when the overlapping region exists between the moved first region and the second region, and updates the image of the second image in the memory by the duplicated image; the image of the second region and the updated image of the second region are stored in same memory addresses in the memory.

9. The electronic device according to claim 6, wherein the processing unit updates position information of the moved first region according to the movement instructed by the movement command and the position information of the unmoved first region.

10. The electronic device according to claim 9, wherein the processing unit determines whether the moved first region exceeds the second region according to the position information of the moved first region and position information of the second region.

* * * * *